July 18, 1933.　　　　　A. J. HERONIMOS　　　　　1,918,908
STROBOSCOPIC RELATIVE SPEED INDICATOR
Filed Jan. 6, 1931　　　2 Sheets-Sheet 1
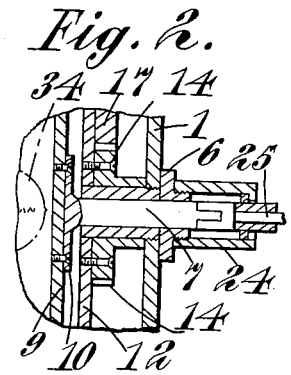
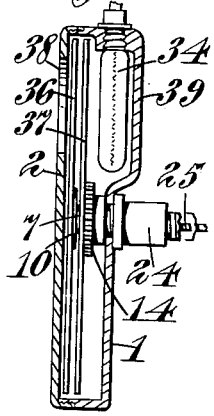
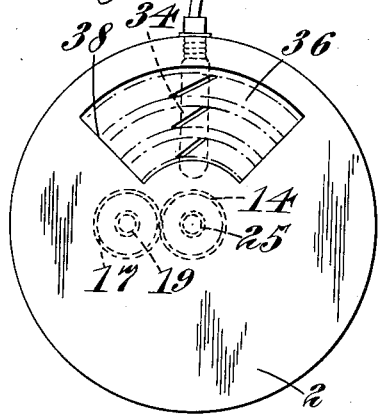
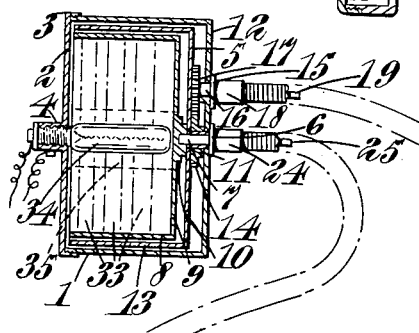
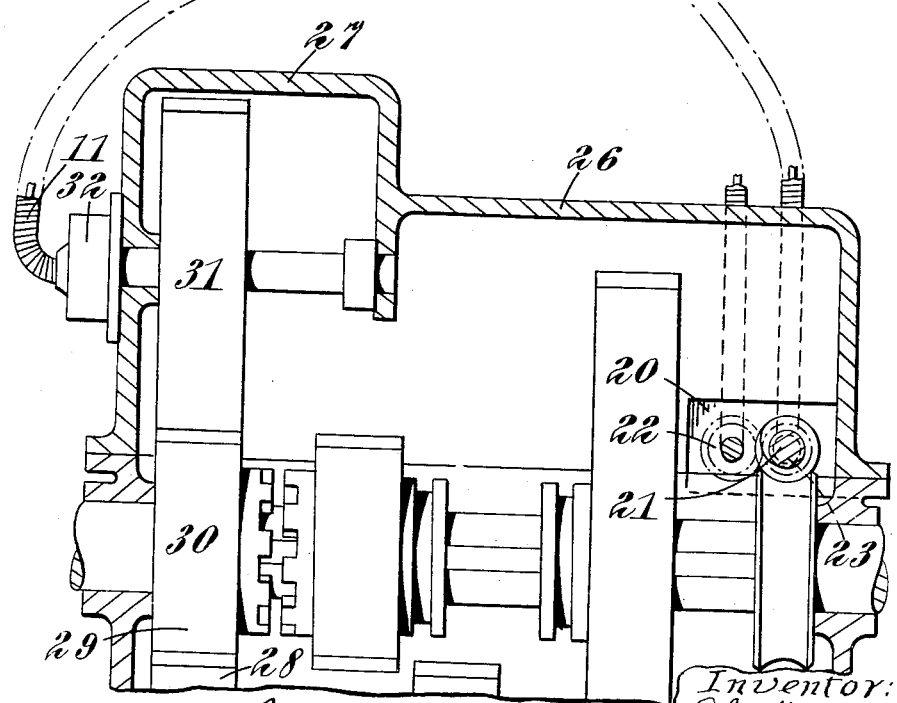

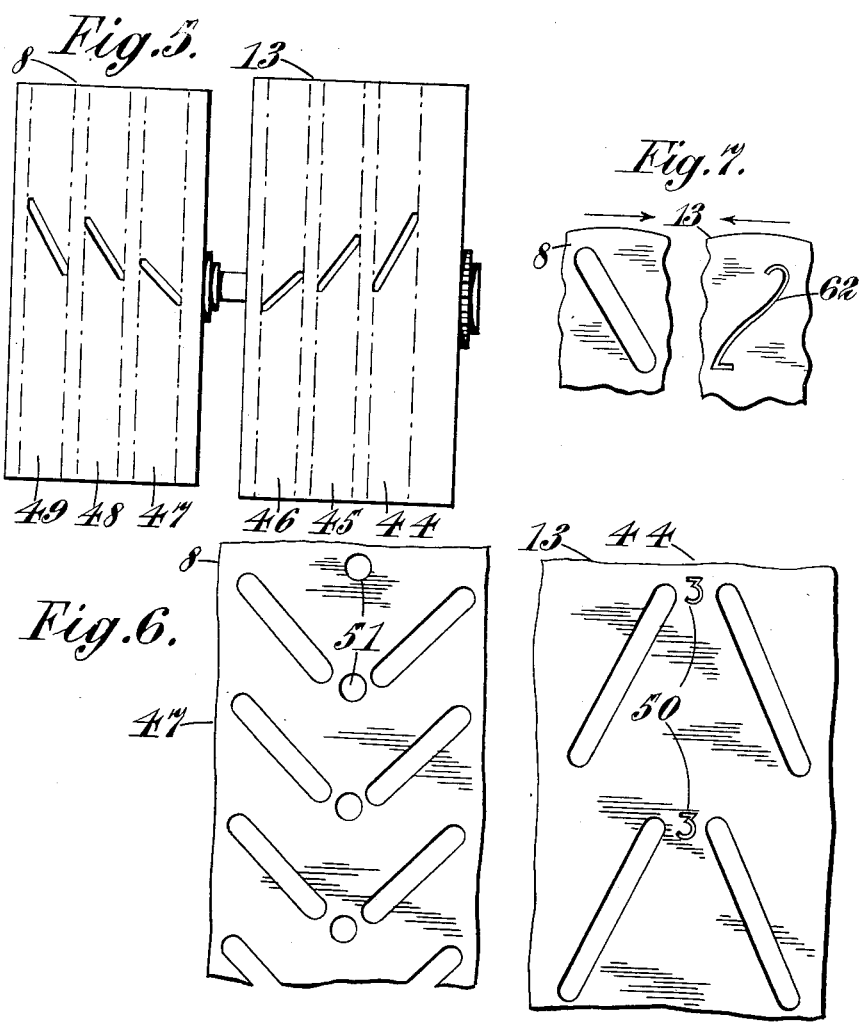

Patented July 18, 1933

1,918,908

UNITED STATES PATENT OFFICE

ARTHUR JOSEPH HERONIMOS, OF LONDON, ENGLAND

STROBOSCOPIC RELATIVE SPEED INDICATOR

Application filed January 6, 1931, Serial No. 507,033, and in Great Britain January 18, 1930.

This invention is for improvements in or relating to speed indicators and speed ratio indicators and has for one of its objects to provide a construction for use in a motor car which will enable the driver to determine the appropriate relative speed between the driving and driven shafts of the change speed gear box at which a noiseless engagement of a set of gears may be effected.

According to this invention a stroboscopic indicator comprises in combination, two driving shafts, connections arranged for coupling said shafts to two rotating parts of a mechanism, a relative speed of which it is required to indicate, an indicating member secured to one of said shafts and having a plurality of indications thereon which are inclined to their direction of movement, an analyzing member secured to the other said shaft and having a plurality of slots thereon inclined in an opposite direction to that of the indications, which connections are so arranged and which analyzing and indicating members are so disposed that the slots and indications travel past one another in opposite directions relatively to the observer. The ratio of the numbers of apertures and the number of indication marks are arranged to be equal to the relative speed ratio which it is required to indicate. For example, if a ratio of 3 to 7 is required to be indicated five indication marks are provided and seven apertures. It will be seen that under certain circumstances a single set of apertures might be employed for co-operation with a number of sets of indications, or vice versa providing the relative speed ratios possess a common factor. For example, a single set of apertures or a single set of indications might be used for speed ratios of 2 to 7, 3 to 7, and 5 to 7.

The indicating member and analyzing shutter may comprise either two discs arranged face to face or two drums, one nested inside the other. In the former arrangement the indications may be arranged around concentric circles and the apertures in the analyzing shutter may be arranged on corresponding circles. In the latter arrangement the indications may be arranged on a number of circumferential tracks on both drums.

An important feature of the invention consists in that each set of apertures on the analyzing shutter comprises a number of slots all inclined at the same angle to the direction of their movement and in that all the indications (e. g. slots) in a set of indications are inclined at the same angle to their direction of movement in an opposite sense to that of the analyzing slots with which they co-operate and in that the ratio of the co-tangents of the angles of the inclination of the slots and indications in co-operating sets of slots and indications is proportional to (e. g. equals) the ratio of speeds required to be indicated between the rotatable member which drives the analyzing shutter and the rotatable member which drives the indicating member. It follows that with this arrangement when a different number of inclined slots are employed in two co-operating sets of slots the angle of inclination of the slots is different in each set. The important advantage of this arrangement is that when the relative speeds between the rotatable members has attained the value to be indicated the images of the indications effected by the appropriate set of slots appear as stationary parallel axial lines in the case where nested drums are employed and as stationary radial lines in the case where co-operating discs are employed, while, should the relative speeds between the rotatable members be a harmonic, or sub-multiple of, the selected speed to be indicated, multiple stationary images would appear which are in one case inclined to the axis of the drums and in the other case inclined to the radii of the discs. It will therefore be appreciated that it is easy to distinguish between fundamental relative speeds and harmonics of the fundamental relative speeds.

According to a still further feature of the invention in place of the inclined slots either on the indicating member or analyzing shutter there is provided legends such as numerals which are inclined similarly to the inclined slots which they replace. Thus, one set of slots will be replaced by say, a number of numerals "2". It will be appreciated with the above arrangement that the images will be distorted from the original shape of the indications and a feature of the invention consists in so shaping the indications that the distorted images thereof bear the required shape.

A stroboscopic indicator according to any of the constructions described above for indicating the correct relative speed between a driving and driven shaft of a change speed gear at which changes of gear should be effected is provided with means (e. g. a flexible shaft) for connecting the analyzing shutter to one of said gearbox shafts and means (e. g. another flexible shaft) for connecting the indicating member to the other said gearbox shaft. Alternatively, in place of the driven shaft of the gearbox there may be used an existing speedometer drive. It will be appreciated that the ratio of speeds of the flexible drives must be arranged to correspond with the rate of speeds of the driving and driven shafts of the gearbox.

There are now described a number of stroboscopic instruments constructed according to this invention. Reference is made to the accompanying drawings, in which:

Figure 1 is a cross section through a change speed gear indicator embodying nested drums, which indicator is arranged for operation from a motor car gearbox which is shown diagrammatically;

Figure 2 is an enlargement of that part of Figure 1 which shows the driving mechanism for the drums, Figure 3 is a cross section through a change speed gear indicator comprising two rotatable discs, Figure 4 is a front elevation of Figure 3, Figure 5 is a side elevation of the drums employed in the construction of Figure 1.

Figures 6 and 7 both show developments of the two drums indicating different methods of forming the indicators and slots for use in the construction of Figure 1.

The change speed gear indicator illustrated in Figures 1 and 2 comprises an outer cylindrical casing 1 closed at one end by a cap 2 having a screw-threaded flange 3 which engages with threads on said casing. The said cap is provided with centrally disposed electric light socket 4. The other end of the cylindrical casing is closed by a plate 5 formed integral with the casing. Secured centrally in said plate is a bush 6 (better shown in Figure 2) in which is mounted a driving shaft 7 for an indicating member in the form of a drum 8. The drum 8 is provided with an end plate 9 which is attached to a flange 10 at the end of the aforesaid shaft. The end plate of the drum is spaced away from the end plate 5 of the cylindrical casing and the bush 6 extends across this space. Mounted on the said bush is a bearing sleeve 11 to which is secured an end plate 12 of an outer drum 13. The said bearing sleeve is provided with a flange which is cut to form a pinion 14. A second bush 15 is secured in said end plate 5 eccentrically to the first said bush and accommodates a second driving shaft 16. Secured to the inner end of said second shaft 16 is a gear wheel 17 which is arranged to engage the aforesaid pinion 14. The shaft 16 is connected through a suitable coupling 18 with a flexible shaft 19 which is coupled at the other end to the speedometer drive for the motor car. For this purpose a small auxiliary gearbox 20 may be provided for connection with the shaft 21 which extends from the gearbox of the engine and normally drives the speedometer. The said auxiliary gearbox provides two driving shafts 22 and 23, one for coupling to the aforesaid shaft 19 and the other for coupling to the speedometer. The shaft 7 of the change speed gear indicator is connected through a suitable coupling 24 to a shaft 25 which is driven at the speed of the layshaft of the gearbox. It may be inconvenient in some gearboxes to effect a direct drive from said layshaft and in Figure 1 there is shown an arrangement in which there is mounted in the gearbox cover 26 a pinion 27 corresponding in size and number of teeth to that layshaft pinion 28 which is in permanent engagement with the gear wheel 29 fixed to the driving shaft 30. This pinion 27 is also arranged to engage with the gear wheel 29. It may be necessary to provide a special gearbox lid, but this is a comparatively simple and cheap expedient. The pinion 27 is fixed to a shaft 31 which is connected through a suitable coupling 32 to the end of the flexible shaft 25.

The gearbox illustrated is a three-speed gearbox and consequently the change-speed gear indicator requires to be provided with three sets of indications. The directions of rotation of the flexible shafts 11 and 19 are so arranged that the drums 8 and 13 are rotated in opposite directions. In the arrangement shown in Figure 1 the sets of indications are in the form of slots cut in the inner drum and arranged in three bands 33 spaced apart along the axial length of the drum. The outer drum comprises the analyzing shutter and is provided with three bands of slots so spaced apart that each band co-operates with a band of slots on the inner drum. An electric light bulb 34, preferably of the strip light type, is arranged to extend axially into the inner drum for a distance across all three said bands of slots.

The outer cylindrical casing may be provided with a window shown by dotted lines 35.

In the construction shown in Figures 3 and 4 the drums are replaced by two discs 36 and 37 which are driven in a similar manner to that described in respect of Figures 1 and 2, like parts being given like references.

As in the previous construction the mechanism is housed in a cylindrical casing 1 and the indicating disc is viewed through a window 38 formed in the cap 2. The light source is arranged to the rear of the two discs opposite said window. A suitable housing 39 is provided in said casing for this light source.

Figures 5, 6 and 7 illustrate different methods of slotting the drums of the construction illustrated in Figures 1 and 2. In each case the drums are slotted so as to be suitable for use with a gearbox which provides the following three gear-ratios between the layshaft and that driven shaft of the gearbox which is connected to the road wheels:—Top gear 28 to 16, middle gear 1 to 1, and bottom gear 15 to 29.

It will be appreciated that the above ratios do not represent the ratio between the speed of the engine and the propeller shaft for the car but only represent the ratio of speeds between the layshaft and the propeller shaft. For example, for top gear the engine shaft and propeller shaft are directly coupled and there is a gear ratio of 1 to 1, but when they are so coupled the engine shaft still drives the layshaft and the speed ratio between the layshaft and the engine shaft or propeller shaft is 28 to 16.

The gear wheel 17 and the pinion 14 shown in Figure 1 are so selected that the outer drum 13 is driven at a speed proportional to the speed of the driven shaft of the gearbox. In the cases illustrated the outer drum is driven at the same speed as said driven shaft. Under these conditions the ratio of number of slots in the outer and inner drums must be the same as the speed-ratios between the layshaft and said driven shaft according to which set of gears is engaged. In all the arrangements illustrated in Figures 5 to 7 the outer drum which is connected to said driven shaft is provided with three sets of slots, one of which sets 44 comprises sixteen slots, another set 45 comprises twenty-two slots and another set 46 comprises twenty-nine slots, while the corresponding sets of slots 47, 48 and 49 on the inner drum comprise twenty-eight slots, twenty-two slots and fifteen slots respectively. It is to be noted in Figure 5 that the slots on both drums are inclined to an axial line, the sense of inclination of the two sets of slots being different. It has already been stated that the angles of inclination of the slots in two co-operating sets of slots should be so chosen that the ratio of the co-tangents of the angle which the slots make to the direction of their movement is equal to the ratio of the speeds of the rotatable members which is required to be indicated, whereby the images of the indications at the fundamental relative speed may be distinguished from multiple images at harmonic or sub-multiple speeds. It will also be noted that in each set of slots the lengths of the slots are so selected that at all times a part of at least one slot is opposite a fixed datum line. With this arrangement the flicker effect is greatly reduced. A convenient method of obtaining the correct angles for the slots when the lengths of the slots are such as last described above is to make the axial stretch of slots the same in each co-operating set of slots. It is then only necessary to inscribe two circumferential lines on the drum for each set of slots, the distance apart of the lines being equal to the axial extent of the slots. A number of axial lines corresponding to the number of slots required are then drawn between the two aforesaid circumferential lines. The required length and inclination of the slots is then obtained by joining the opposite corners of each geometrical figure thus obtained. When the two drums are rotating at the correct relative speed for any one of the three gears to be engaged the image of the slots in the appropriate set of slots appears to be stationary and to extend parallel with the axis of rotation. If the ratio of the speed of the inner drum to the outer drum is a harmonic of the relative speed required to be indicated by any co-operating sets of slots, the images of the slots are inclined in a similar sense to those of the slots in the outer drum but of a greater or lesser value according to whether the harmonic is a "first", "second" or "third" harmonic. If, on the other hand, the relative speeds between the inner and outer drums is a sub-multiple of the fundamental relative speed the inclination of the slot images is in the same sense as those of the slots in the inner drum. At relative speeds near the fundamental speeds, harmonics or sub-multiples of the fundamental speeds, moving multiple images are produced which may rotate either one way or the other according to the variation of the ratios. It will be seen, therefore, by noting the sense of the inclination of the slots it may be determined whether the engine of the car requires to be accelerated or retarded in order to arrive at the correct speeds for changing a gear.

Figure 6 shows a development of the sets of slots on the inner and outer drums which correspond to top gear. The set of slots on the right-hand of the figure are a development of the outer drum and those on the left-hand of the figure a development of the inner drum. It will be noted that in each set the slots are arranged in V formation and at the apexes of the V's of the set on the outer drum perforations 50 are formed in the shape of the numeral "3", while at the apexes on the inner drum circular perforations 51 are formed. With this arrangement, when the two sets of slots are rotating at the appropriate relative speed for a gear change to be effected the images of the slots appear as straight lines having a gap at their centre in which the numeral "3" appears. Should the ratio of the speed of the inner drum to the outer drum be a harmonic of the relative speed required to be indicated the resultant image is V-shaped with the apex of the V directed in the same sense as the rotation of the outer drum. Should the relative rotation of the drums be a sub-multiple of the relative speed required to be indicated the apex of the V image is directed in the same sense as the V on the inner drum.

Figure 7 is a development of two sets of slots in each of the inner and outer drums which are appropriate for indicating top speed and middle speed. The arrangement of slots is similar to that of Figure 4, with the exception that one set of slots in the outer drum is replaced by the legends 52 in the form of the numeral "2" which are cut in the material of the outer drum in the manner shown. It will be noted that the numeral as a whole is distorted and inclined. With this arrangement when the drums are rotating at an appropriate speed the image of the numeral appears to be vertical.

It will be appreciated that many modifications may be made to details of construction without departing from the scope of this invention. For example, a flickering light source may be employed for either the indicating means or the analyzing means and the rotation of the analyzing means or indicating means may either be actual or optical. The word "operated" quoted at the commencement of the specification is intended to include these various ways by which the indicating and analyzing means may be energized. Furthermore, the indicator may be arranged for indicating the speed of a vehicle by the provision of means for operating the indicating member at a constant speed and by the provision of means for rotating the analyzing shutter at the road-wheel speed or vice versa. Such an arrangement may be used in combination with the device decribed above for indicating the correct time at which gear change should be effected.

I claim:—

1. A stroboscopic indicator comprising in combination, two driving shafts, connections arranged for coupling said shafts to two rotating parts of a mechanism, a number of relative speeds of which it is required to indicate, an indicating member secured to one of said shafts and having a plurality of concentrically arranged sets of indications, one set for each relative speed to be indicated, each of which indications is inclined to its direction of movement, a rotatable shutter secured to the other said shaft and having a plurality of sets of apertures concentrically arranged thereon so that one set of indications is viewable through one set of apertures, which apertures are inclined oppositely to the direction of the indications, the ratio of the number of indications and apertures in each cooperating set is selected to be directly proportional to a relative speed ratio required to be indicated, which connections are so arranged and which analyzing and indication members are so disposed that the slots and indications travel past one another in opposite directions relatively to the observer.

2. A stroboscopic indicator comprising in combination, two driving shafts, connections arranged for coupling said shafts to two rotating parts of a mechanism, a number of relative speeds of which it is required to indicate, a cylindrical indicating member secured to one of said shafts and having a plurality of sets of indications thereon which are inclined to their direction of movement, a cylindrical analyzing member secured to the other said shaft and encircling the indicating member and having a plurality of sets of slots thereon inclined in an opposite direction to that of the indications, which connections are so arranged and which analyzing and indicating members are so disposed that a set of slots and a set of indications travel past one another in opposite directions relatively to the observer, and the ratio of the number of slots and indications in a cooperating set of slots and indications is selected to be directly proportional to a selected speed ratio of the two parts of said mechanism.

3. A stroboscopic indicator comprising in combination, two driving shafts, connections arranged for coupling said shafts to two rotating parts of a mechanism, a number of relative speeds of which it is required to indicate, a disc secured to one of said driving shafts and having a plurality of concentrically arranged sets of indications thereon, each of which indications is inclined to a radius, a second disc secured to the other driving shaft and having a plurality of sets of slots concentrically arranged thereon, each of which slots is inclined in an opposite direction to that of the indications, which connections are so arranged and which discs are so disposed that a set of slots and a set of indications travel past one another in opposite directions relatively to the observer, and the ratio of the number of slots and indications in a cooperating set of slots and indications is selected to be directly proportional to a selected speed ratio of the two parts of said mechanism.

4. A stroboscopic indicator for indicating any of a plurality of preselected relative speeds between two relatively rotatable members comprising in combination a rotatable disc connected to one of said rotatable members, a plurality of concentrically arranged sets of slots in said disc, one set for each relative speed to be indicated, each of which slots is inclined to its direction of movement, a second rotatable disc arranged face to face with the first said disc and in axial alignment therewith, means for connecting the drums to the rotatable members so as to drive the former in opposite directions, a plurality of sets of slots concentrically arranged on said second disc, each of which slots is inclined in the opposite sense to those of the slots on the first disc, which sets of slots on the two discs are so arranged that one set of slots on one disc cooperates with one set of slots on the other disc and so that in cooperating sets of slots the ratio of the number of slots in the two sets is directly proportional to the relative speed ratio to be indicated by those cooperating sets, and a light source disposed on one side of said two discs.

ARTHUR JOSEPH HERONIMOS.